(12) United States Patent
Chao

(10) Patent No.: US 10,621,403 B2
(45) Date of Patent: Apr. 14, 2020

(54) FINGERPRINT CAPTURING DEVICE

(71) Applicant: Shenzhen Goodix Technology Co., Ltd., Shenzhen, Guangdong (CN)

(72) Inventor: Weimin Chao, Guangdong (CN)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 17 days.

(21) Appl. No.: 15/784,201

(22) Filed: Oct. 16, 2017

(65) Prior Publication Data

US 2018/0096184 A1 Apr. 5, 2018

Related U.S. Application Data

(63) Continuation of application No. PCT/CN2016/101420, filed on Oct. 1, 2016.

(51) Int. Cl.
*G06K 9/00* (2006.01)
(52) U.S. Cl.
CPC ....... *G06K 9/0002* (2013.01); *G06K 9/00046* (2013.01)
(58) Field of Classification Search
CPC ............ G06K 9/0002; G06K 9/00046
USPC ............................................ 382/127
See application file for complete search history.

(56) References Cited

U.S. PATENT DOCUMENTS

| | | | |
|---|---|---|---|
| 5,650,842 A | 7/1997 | Maase | |
| 5,892,599 A * | 4/1999 | Bahuguna | G06K 9/00046 356/71 |
| 6,327,376 B1 * | 12/2001 | Harkin | G01B 7/004 356/71 |
| 6,582,088 B2 * | 6/2003 | Hung | G02B 26/10 359/850 |
| 6,750,955 B1 * | 6/2004 | Feng | G06K 9/00046 356/71 |
| 6,980,286 B1 * | 12/2005 | Feng | G02B 13/08 356/71 |
| 9,002,586 B2 * | 4/2015 | Feit | B60R 25/252 340/5.53 |
| 2007/0147667 A1 | 6/2007 | Sumita | |
| 2008/0239285 A1 | 10/2008 | Wang | |

(Continued)

FOREIGN PATENT DOCUMENTS

| | | |
|---|---|---|
| CN | 1414400 A | 4/2003 |
| CN | 101046845 A | 10/2007 |
| CN | 201465142 U | 5/2010 |

(Continued)

*Primary Examiner* — Jonathan S Lee
(74) *Attorney, Agent, or Firm* — Winston Hsu

(57) ABSTRACT

The present invention provides a fingerprint capturing device comprising a capacitor sensing module, for receiving a finger press to generate a reference signal according to the finger press, wherein the capacitor sensing module comprises a capturing platform and a sensing electrode; an image sensing module, connected to the capacitor sensing module, for activating a lighting component to emit a light beam after the capacitor sensing module generates the reference signal, so as to generate a fingerprint image of the finger. The hybrid fingerprint capturing device provided by the present invention can effectively reduce power consumption of fingerprint recognition device when capturing fingerprint, and have an advantage of improving more comfortable usage scenarios to users.

6 Claims, 2 Drawing Sheets

(56) References Cited

U.S. PATENT DOCUMENTS

2017/0323143 A1\* 11/2017 Prytkov et al.
2018/0211078 A1\* 7/2018 Lillie .................. G06K 9/0002

FOREIGN PATENT DOCUMENTS

| CN | 102750520 A | | 10/2012 |
|---|---|---|---|
| CN | 202677425 U | \* | 1/2013 |
| CN | 202677425 U | | 1/2013 |
| KR | 10-2009-0125972 | | 12/2009 |
| WO | 2004/057523 A1 | | 7/2004 |

\* cited by examiner

FINGERPRINT CAPTURING DEVICE

CROSS REFERENCE TO RELATED APPLICATIONS

The present application is a continuation of international application No. PCT/CN2016/101420, filed on Oct. 1, 2016, of which are incorporated herein by reference in its entirety.

FIELD OF THE INVENTION

The present invention relates to a fingerprint capturing device, and more particularly, to a fingerprint capturing device of capacitor/optic hybrid.

BACKGROUND

With the development of technology, mobile phones, digital cameras, tablet PCs, notebook computers and other portable electronic devices have become essential equipments for human life. To effectively avoid internal data of the personal portable electronic devices being stolen, all kinds of protection methods are provided. For example, password verification, voiceprint recognition or fingerprint recognition and so on, wherein optic fingerprint recognition is widely used. However, since a light source of a current optic fingerprint sensor has to stay on, in order to generate fingerprint images on an image sensing module, high power consumption occurs for long-time use. In addition, continuously or intermittently lighting of the light source affects sensation of users.

SUMMARY

It is therefore a primary objective of the present invention to provide a fingerprint capturing device of capacitor/optic hybrid and low power consumption.

To solve the above mentioned technical problems, the present invention provides a fingerprint capturing device characterized by comprising a capacitor sensing module, for receiving a finger press to generate a reference signal according to the finger press, wherein the capacitor sensing module comprises a capturing platform and a sensing electrode; an image sensing module, connected to the capacitor sensing module, for activating a lighting component to emit a light beam after the capacitor sensing module generates the reference signal, so as to generate a fingerprint image of the finger.

Preferably, the reference signal is generated when the sensing electrode receives the finger press and generates a capacitance variation.

Preferably, the fingerprint capturing device further comprises a reflective module, for directing the light beam from the lighting component to the image sensing module, to generate the fingerprint image.

Preferably, the reflective module comprises a prism and a condenser component.

Preferably, the reflective module comprises a plurality of reflective mirrors.

Preferably, when the reflective module consists of the prism and the condenser component, the light beam passes through the prism and is reflected by the condenser component to generate the fingerprint image on the image sensing module.

Preferably, when the reflective module consists of the plurality of reflective mirrors, a first reflective mirror of the plurality of reflective mirrors respectively exists an angle smaller than 90 degrees with the capturing platform and the sensing electrode, such that the light beam passes through the first reflective mirror and a second reflective mirror of the plurality of reflective mirrors to generate the fingerprint image on the image sensing module.

Preferably, the capturing platform is a glass.

Preferably, the sensing electrode is one of a transparent conductive film, a double-sided flexible printed circuit board, or a printed circuit board.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Figure 1:
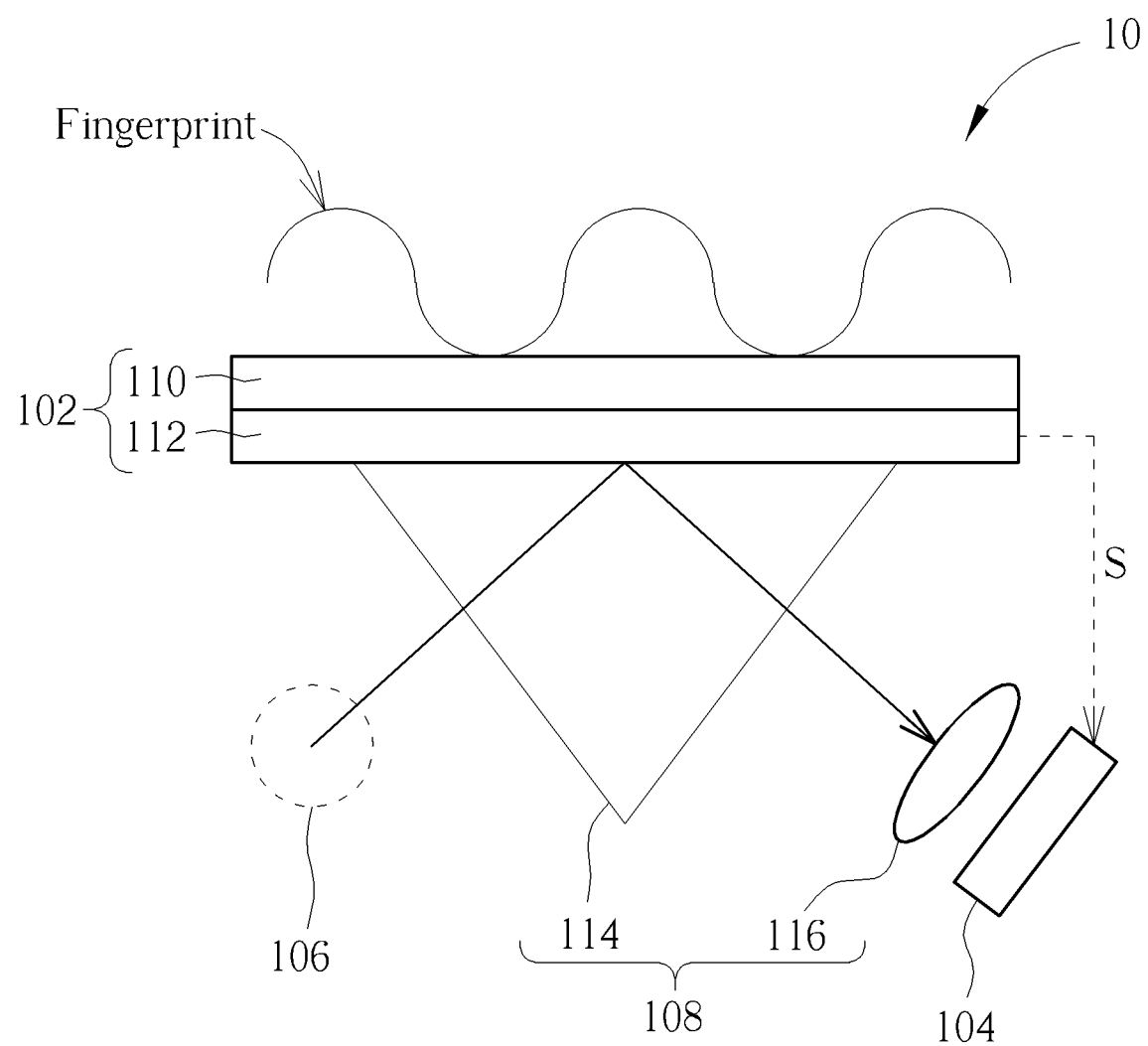
FIG. 1 is a schematic diagram of a fingerprint capturing device according to an embodiment of the present invention.

Please refer to FIG. 1. FIG. 1 is a schematic diagram of a fingerprint capturing device 10 according to an embodiment of the present invention. The fingerprint capturing device 10 includes a capacitor sensing module 102, an image sensing module 104, a lighting component 106 and a reflective module 108. The capacitor sensing module 102 is utilized for capturing a fingerprint and generating a reference signal S, which includes a capturing platform 110 and a sensing electrode 112. The capturing platform 110 is a place to receive a finger press, the sensing electrode 112 generates the reference signal S when a capacitance variation is satisfied according to the finger press; for example, when an user's finger presses the capturing platform 110 (e.g. a glass surface or an acrylic sheet), the sensing electrode 112, e.g. Indium Tin Oxide (ITO) or other transparent conductive film and so on, generates the reference signal S, when a capacitance variation is satisfied according to the finger press. The image sensing module 104 connects to the sensing electrode 112 of the capacitor sensing module 102. After the image sensing module 104 receives the reference signal S from the sensing electrode 112, the image sensing module 104 activates the lighting component 106 to emit a light beam and generates fingerprint image of the finger. And the reflective module 108 directs the light beam from the lighting component 106 to the image sensing module 104, such that the fingerprint image is generated on the image sensing module 104. Therefore, the fingerprint capturing device of the present invention does not need to activate the lighting component all the time, while utilizing the capacitor sensing module to activate the lighting component, to effectively reduce power consumption and provide more comfortable scenarios for the user.

In detail, in an embodiment, the reflective module 108 of the fingerprint capturing device 10 includes a prism 114 and a condenser component 116, wherein the prism 114 is utilized for passing the light beam from the lighting component 106, and reflecting finger ridges and finger valleys of the finger, which presses on the capturing platform 110, and by the condenser component 116, e.g. a convex lens, the fingerprint image is generated on the image sensing module 104. More specifically, when the finger presses on the capturing platform 110 (e.g. the glass surface or the acrylic sheet), such that the sensing electrode 112 (e.g. the transparent conductive film) satisfies the capacitance variation, the sensing electrode 112 generates the reference signal S. Then, when the image sensing module 104 receives the reference signal S, which satisfies the capacitance variation, the image sensing module 104 activates the light beam of the lighting component 106 to pass through the prism 114 and the condenser component 116 to reflect and focus, such that the image sensing module 104 generates the fingerprint image. Therefore, by the finger pressing the capacitor sensing module to activate the lighting component, the lighting component does not need to keep glowing all the time or intermittently emit lights, which saves the power consumption of the fingerprint capturing device and improves usage conveniences of the user.

Figure 2:
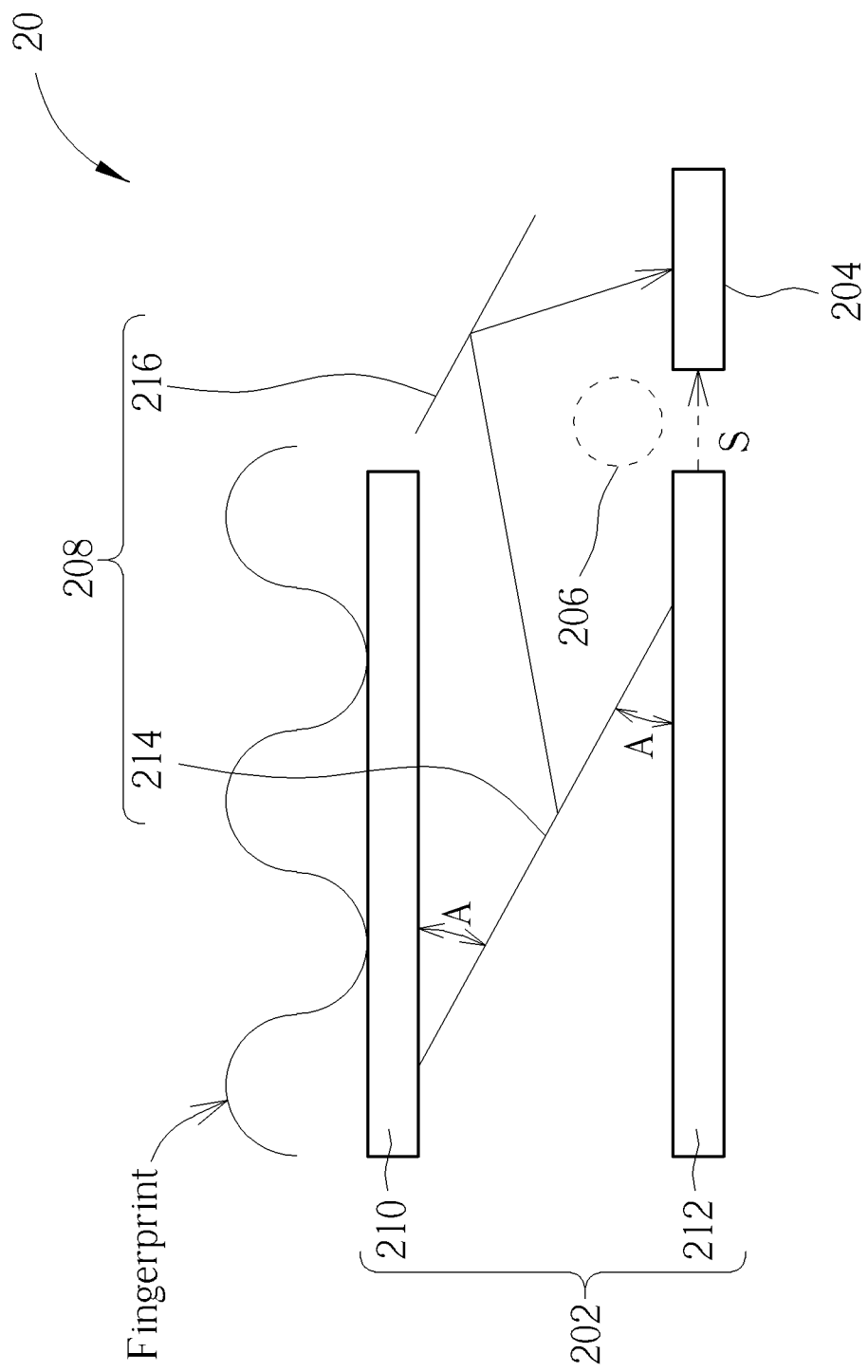
FIG. 2 is a schematic diagram of another fingerprint capturing device according to an embodiment of the present invention.

In another embodiment, please refer to FIG. 2. FIG. 2 is a schematic diagram of another fingerprint capturing device 20 according to an embodiment of the present invention. The fingerprint capturing device 20 is derived from the fingerprint capturing device 10 of FIG. 1, and the fingerprint capturing device 20 includes a capacitor sensing module 202, an image sensing module 204, a lighting component 206 and a reflective module 208, wherein the capacitor sensing module 202 includes a capturing platform 210 and a sensing electrode 212. The capturing platform 210 is utilized for receiving a finger press. The sensing electrode 212 generates a reference signal S when a capacitance variation is satisfied according to the finger press, which may be, for example, Double-sided Flexible Print Circuit (FPC), Printed Circuit Board (PCB) or other non-transparent conductive film and so on. The difference between the fingerprint capturing device 20 and the fingerprint capturing device 10 is that the reflective module 208 consists of the reflective mirrors 214 and 216, and in this example, the reflective mirror 214 respectively exists an angle A smaller than 90 with the capturing platform 210 and the sensing electrode 212, and position where the reflective mirror 216 locates is approximately parallel to the reflective mirror 214. However, positions, where the reflective mirrors 214 and 216 locate, change with position of the image sensing module 204, but not limited herein. That is, as long as the image of the fingerprint is generated on the image sensing module 20 after being reflected by the reflective mirrors 214 and 216, such technique belongs to the scope of the present invention. More specifically, after the finger presses the capturing platform 210 (e.g. the glass surface or the acrylic sheet), and causes the sensing electrode 212 (e.g. the printed circuit board) to satisfy the capacitance variation, the reference signal S is generated. Then, after the image sensing module 204 receives the reference signal S, which satisfies the capacitance variation, the image sensing module 204 activates the light beam of the lighting component 206 to be reflected by the reflective mirror 214 and the reflective mirror 216, so as to generate the fingerprint ridges and fingerprint valleys of the fingerprint image on the image sensing module 204. In addition, compared to the fingerprint capturing device 10, the fingerprint capturing device 20 does not need to reflect the image of the fingerprint by the prism on the image sensing module 204, which can substantially reduce the volume of the device and be applied to mobile handy devices. Therefore, using the capacitance variation of the sensing electrode caused by the finger press to activate the lighting component, the lighting component does not need to keep glowing all the time or intermittently emit lights, which saves the power consumption of the fingerprint capturing device and improves usage conveniences of the user.

Notably, the embodiments stated in the above are utilized for illustrating the concept of the present invention. Those skilled in the art may make modifications and alterations accordingly, and not limited herein. For example, the positions and ways for placing the reflective mirrors may be varied according to different usage scenarios, and the capacitance variation of the sensing electrode caused by the finger press to generate the reference signal can be changed according to statistics of experimental data, computational random or artificial settings, which are not limited herein, and all belong to the scope of the present invention.

In summary, the present invention provides a capacitor/optic hybrid fingerprint detection device, such that the fingerprint capturing device does not need to keep the lighting component glowing all the time or intermittently emitting lights, and only needs to keep the lighting component on when necessary to capture the fingerprint, to achieve the advantages of low power consumption and improve comfort of the users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint capturing device, characterized by comprising:
   a capacitor sensing module, comprising:
      a capturing platform, for receiving a finger press; and
      a sensing electrode, for generating a reference signal according to the finger press;
   an image sensing module, connected to the sensing electrode, for activating a lighting component to emit a light beam after receiving the reference signal generated by the sensing electrode of the capacitor sensing module, so as to generate a fingerprint image of the finger; and
   a reflective module, disposed in the capacitor sensing module, for directing the light beam from the lighting component to the image sensing module, to generate the fingerprint image;
   wherein the reflective module comprises a plurality of reflective mirrors, and when the reflective module consists of the plurality of reflective mirrors, a first reflective mirror of the plurality of reflective mirrors respectively exists an angle smaller than 90 degrees with the capturing platform and the sensing electrode, such that the light beam passes through the first reflective mirror and a second reflective mirror of the plurality of reflective mirrors to generate the fingerprint image on the image sensing module;
   wherein the first reflective mirror and the second reflective mirror are parallel to each other.

2. The fingerprint capturing device of claim 1, characterized in that, the reference signal is generated when the sensing electrode receives the finger press and generates a capacitance variation.

3. The fingerprint capturing device of claim 1, characterized in that, the reflective module comprises a prism and a condenser component.

4. The fingerprint capturing device of claim 3, characterized in that, when the reflective module consists of the prism and the condenser component, the light beam passes through the prism and is reflected by the condenser component to generate the fingerprint image on the image sensing module.

5. The fingerprint capturing device of claim 1, characterized in that, the capturing platform is a glass.

6. The fingerprint capturing device of claim 1, characterized in that, the sensing electrode is one of a transparent conductive film, a double-sided flexible printed circuit board, or a printed circuit board.

* * * * *